(12) United States Patent
Chandler et al.

(10) Patent No.: US 6,768,248 B2
(45) Date of Patent: *Jul. 27, 2004

(54) ELECTRODELESS LAMP (75) Inventors: Robert Chandler, Lexington, MA (US); Oleg Popov, Needham, MA (US); Edward K. Shapiro, Lexington, MA (US); Jakob Maya, Brookline, MA (US)

(73) Assignees: Matsushita Electric Industrial Co., Ltd., Osaka (JP); Matsushita Electric Works, Ltd., Osaka (JP)

( * ) Notice: Subject to any disclaimer, the term of this patent is extended or adjusted under 35 U.S.C. 154(b) by 466 days.

This patent is subject to a terminal disclaimer.

(21) Appl. No.: 09/748,310

(22) Filed: Dec. 26, 2000

(65) Prior Publication Data

US 2001/0000941 A1 May 10, 2001

Related U.S. Application Data (63) Continuation-in-part of application No. 09/435,960, filed on Nov. 9, 1999.

(51) Int. Cl.[7] ............................. H01J 61/52; H01K 1/58
(52) U.S. Cl. ..................... 313/46; 313/161; 313/607; 313/47; 315/248
(58) Field of Search ............................ 313/27, 45–47, 313/161, 234, 248, 155, 607, 490; 315/248

(56) References Cited

U.S. PATENT DOCUMENTS

| | | | |
|---|---|---|---|
| 4,536,675 A | | 8/1985 | Postma ........................ 313/46 |
| 4,661,746 A | * | 4/1987 | Postma et al. ............... 315/248 |
| 5,006,752 A | * | 4/1991 | Eggink et al. ............... 313/161 |
| 5,130,912 A | * | 7/1992 | Friederichs et al. ........ 362/263 |
| 5,291,091 A | * | 3/1994 | Eggink et al. ............... 313/161 |
| 5,306,555 A | * | 4/1994 | Ramamurthi et al. .......... 442/63 |
| 5,412,288 A | | 5/1995 | Borowiec et al. ............ 313/490 |
| 5,412,289 A | | 5/1995 | Thomas et al. .............. 315/248 |
| 5,434,482 A | | 7/1995 | Borowiec et al. ............ 315/248 |
| 5,500,567 A | | 3/1996 | Wilson et al. ............... 313/490 |
| 5,559,392 A | | 9/1996 | Cocoma et al. .............. 313/490 |
| 5,572,083 A | * | 11/1996 | Antonis et al. ................ 313/46 |
| 5,598,069 A | * | 1/1997 | van Os et al. .............. 315/248 |
| 5,698,951 A | | 12/1997 | Maya et al. ................. 315/248 |
| 5,767,617 A | | 6/1998 | Wharmby et al. ........... 313/489 |
| 5,783,912 A | | 7/1998 | Cocoma et al. .............. 315/248 |
| 5,789,855 A | | 8/1998 | Forsdyke et al. ............ 313/490 |
| 5,841,229 A | | 11/1998 | Borowiec et al. ........... 313/490 |
| 5,847,508 A | | 12/1998 | Borowiec et al. ........... 313/553 |
| 6,404,141 B1 | * | 6/2002 | Miyazaki et al. ........... 315/248 |
| 6,433,478 B1 | * | 8/2002 | Chandler et al. ............ 313/607 |
| 2002/0067129 A1 | * | 6/2002 | Chamberlain et al. ...... 313/607 |
| 2003/0057877 A1 | * | 3/2003 | Kurachi et al. ............. 315/248 |

FOREIGN PATENT DOCUMENTS

| | | | |
|---|---|---|---|
| EP | 0 625 794 B1 | 10/1994 | |
| JP | 10-112293 | 4/1998 | |
| JP | 11025925 | * 1/1999 | ............ H01J/65/04 |

\* cited by examiner

Primary Examiner—Nimeshkumar D. Patel
Assistant Examiner—Glenn Zimmerman
(74) Attorney, Agent, or Firm—Kinney & Lange, P.A.

(57) ABSTRACT

An electrodeless lamp includes an envelope (1) containing a fill of discharge gas, a magnetic core t(7), an induction coil (6) wound around the magnetic core (7), a driver circuit for supplying an electric current to the induction coil (6) to operate the electrodeless lamp, a socket (10) for receiving electrical power supplied to the electrodeless lamp, and a heat conduction means (8,9) thermally coupled to the magnetic core (7) for conducting heat generated in the magnetic core (7) to the ambient atmosphere to dissipate heat therein, or coupled to the socket (10) for conducting heat generated in the magnetic core (7) to the socket to dissipate heat therethrough.

21 Claims, 9 Drawing Sheets

FIG. 6 COIL/FERRITE POWER LOSSES vs LAMP POWER

FIG. 7

ELECTRODELESS LAMP

CROSS-REFERENCE TO RELATED APPLICATION

This application is a continuation-in-part application of U.S. application Ser. No. 09/435,960 filed on Nov. 9, 1999, entitled "High Frequency Electrodeless Compact Fluorescent Lamp", by Robert Chandler, Oleg Popov, Edward K. Shapiro and Jakob Maya.

BACKGROUND OF THE INVENTION

The invention relates to electric lamps and, more specifically, to induced plasma electrodeless lamps operated at frequencies above 20 kHz.

Electrodeless fluorescent lamps have been recently introduced in markets for indoor, outdoor, industrial, and commercial applications. The advantage of electrodeless lamps is the removal of internal electrodes and heating filaments that are a life-limiting factor of conventional fluorescent lamps. Therefore, the life of electrodeless fluorescent lamps is substantially higher than that of conventional fluorescent lamps and can reach 100,000 hours.

An electrodeless fluorescent lamp introduced in the market by General Electric Corp. (GENURA) is operated at a frequency of 2.65 MHZ and used for indoor general lighting. This lamp is a replacement for a R30 incandescent lamp and has 1,100 lumen light output at 23 W of total power. The life of the GENURA lamp, 15,000 hrs, is much longer than that of the incandescent lamp. The drawback of the GENURA lamp is the high initial cost, partially due to the need to prevent electromagnetic interference and partially due to the circuit cost operating at 2.65 MHZ. Both drawbacks could be diminished if the electrodeless fluorescent lamp was operated at a frequency as low as 100 Hz.

In U.S. patent application Ser. No. 09/083,820 by Popov et al. and 09/303,951 by Chamberlain et al. (having the same assignee as the parent application hereto, Ser. No. 09/435, 960), electrodeless fluorescent lamps operated at low frequencies from 50 kHz to 500 kHz were described. Those lamps utilized a ferrite core made from MnZn material, a Litz wire coil positioned about the core operated by a radio frequency oscillating driver circuit, and an aluminum cooling structure that removed heat from the reentry cavity walls and ferrite core and redirected heat to the lamp fixture. The aluminum cooling structure comprises an aluminum cylinder inside the ferrite core and an aluminum base welded to the lamp fixture. This approach and construction were found to be very effective to keep the ferrite core at a temperature below its Curie point.

However, in many lamp applications (e.g. the replacement of a conventional incandescent lamp), the large and heavy metal (aluminum or copper) base is not suitable due to its large size and weight. Also, the direct replacement of incandescent lamps requires the use of Edison-type sockets that are coupled with the base. Again, the diameter of the lamp base should not be larger than the diameter of the incandescent lamp bulb that is 60 mm.

The proximity of a ferrite core to the metal base allows the magnetic field generated by the coil and the core to intersect the metal base which results in the increase of the coil/ferrite core power losses. Indeed, the magnetic field generated by the coil induces eddy currents in the metal base that causes power losses and reduces the combined coil/structure quality factor, Q. As a result, the lamp power efficiency and hence, efficacy decreases.

The need for the incorporation of the coil oscillatory driver circuit and the associated impedance matching network in the lamp inside the lamp base and to couple them with the Edison-type socket makes the cooling issue more complex. Indeed, the temperature inside of the lamp base should not exceed around 100° to preserve the integrity of the driver circuit components. The alternative of using of circuit components that can stand higher temperatures leads to higher costs for the driver circuit and hence, the lamp. Thus, there is a desire for a lamp with a compact base and standard socket located outside most of the internally generated magnetic field having a cooling structure limiting the temperature of circuit components therein to economically suitable values.

BRIEF SUMMARY OF THE INVENTION

The present invention comprises an electrodeless fluorescent lamp that includes an envelope, often glass, containing a discharge gas (for example, a mixture of inert gas and mercury vapor) with an enclosure extending between the envelope and an Edison type socket. A ferrite core and an induction coil, typically made from Litz wire, are positioned adjacent the envelope, typically inside of reentrant cavity formed in that envelope. A cooling structure comprises a high thermal conductivity material such as a metal (typically aluminum or copper) tube positioned inside of the core and a thermally coupled high thermal conductivity material (typically ceramic) cylindrical structure that is also thermally coupled to an Edison type socket with material having a high thermal conductivity, or is formed in part as a wall portion between the envelope and the enclosure. The core extends past the tube in a direction away from the enclosure.

DETAILED DESCRIPTION

Figure 1A:
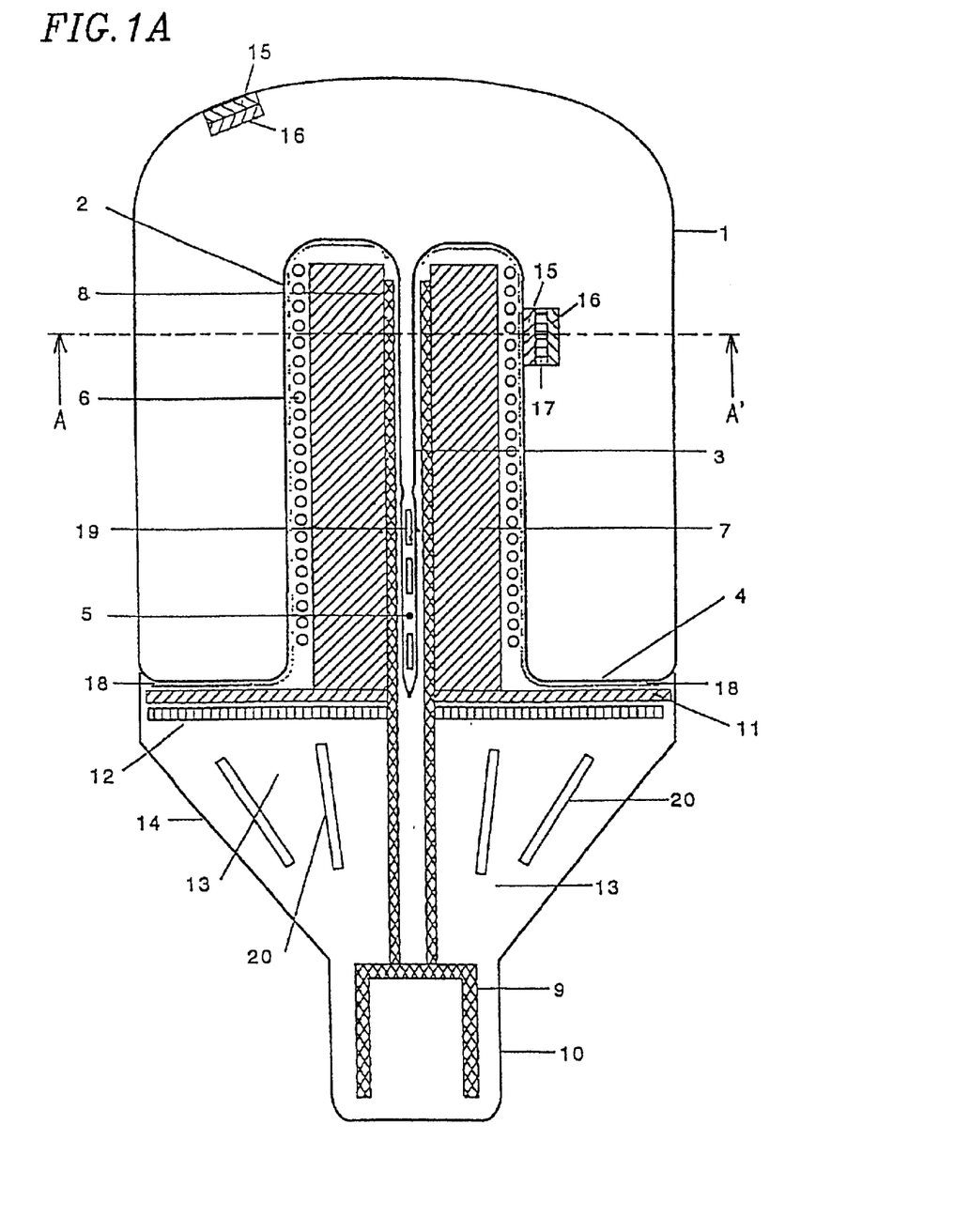
FIGS. 1A and 1B are mutually perpendicular cross-sectional views of a first embodiment of the present invention for an electrodeless compact fluorescent lamp.
Figure 1B:
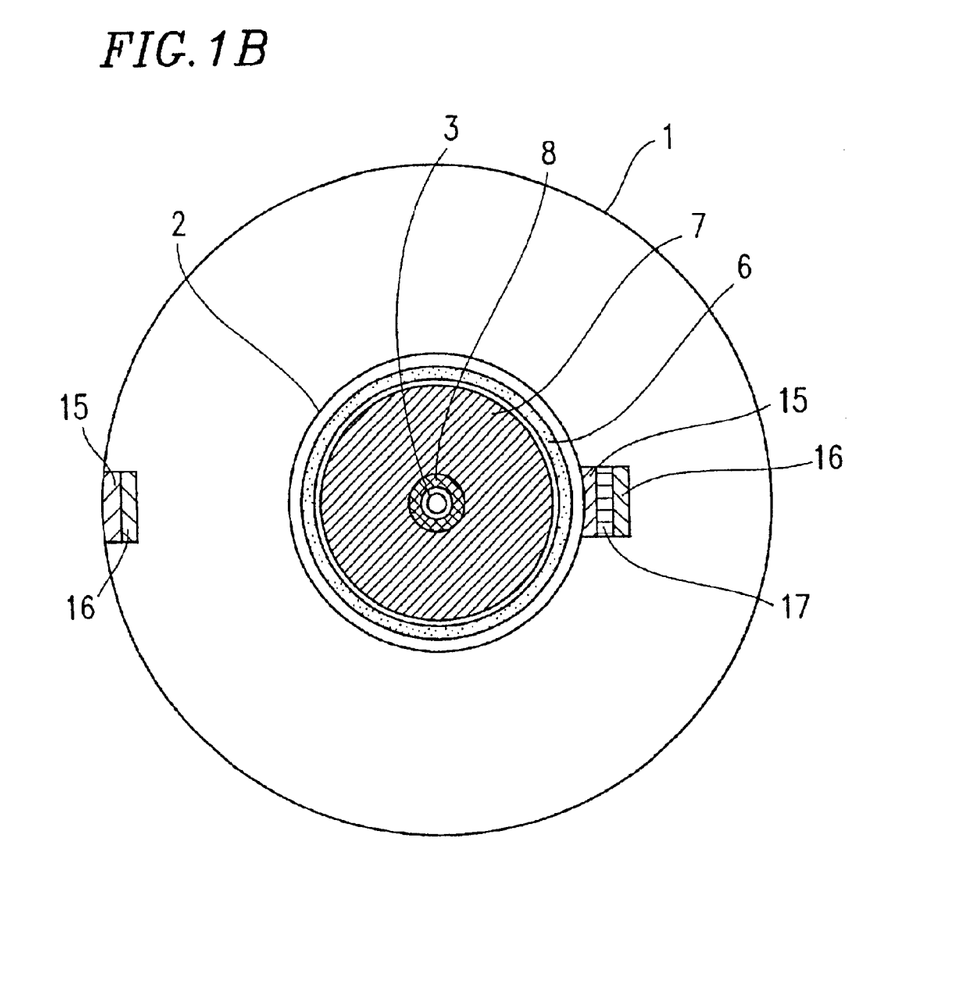

Referring to FIG. 1A, a bulbous envelope 1 made from glass has a reentrant cavity 2 with an exhausting tubulation 3 located inside the cavity 2 on its axis (or possibly off axis). Tubulation 3 extends from a bottom 4 of envelope 1 in that figure. The fill inert gas (argon, krypton, or the like) is provided in envelope 1 at pressures from 0.1 torr to 5 torr (13.3 Pa to 665 Pa). FIG. 1B is a cross-sectional view of the electrodeless fluorescent lamp shown in FIG. 1A taken along section line A-A'.

A mercury amalgam mass (or mercury dispenser) 5 is positioned in tubulation 3 and controls in part the mercury vapor pressure in the envelope. A coil 6 made from multiple insulated stranded wire (Litz wire) is wound around a ferrite core 7 and carries therein during lamp operation oscillatory electrical current provided by an oscillatory driver circuit provided in the lamp and the associated impedance matching circuitry therein. Ferrite core 7 was made from MnZn material (see U.S. patent application Ser. No. 09/303,951 by Chamberlain et al.) and is disposed in reentrant cavity 2 outside envelope 1. Coil 6 and ferrite core 7 are maintained at temperatures below the Curie point (<229° C.) of the core with the aid of a cooling structure made from a metal having high thermal conductivity and low RF power losses (only relatively small eddy currents are generated therein during lamp operation by magnetic fields like those encountered during such operation) such as aluminum, copper, or the like. The cooling assembly comprises a metal tube 8 positioned inside ferrite core 7 and a cylinder 9 (cylindrical portion of that structure) located inside an Edison type socket 10, this cylindrical portion having an adjacent outer portion thereof with a diameter close to that of the inner diameter of Edison type socket 10. Socket 10 is for a screw-in engagement of the lamp into an external lamp holder connected to a source of electrical energy suited to operate the lamp, and which socket can be removed along with the lamp from this holder by unscrewing same.

To minimize the effect of the metal tube on the coil-ferrite combination inductance, the top edge of the metal tube is positioned inside of the ferrite core where the magnetic field generated by the coil and core does not have a significant radial component. By positioning the top edge of metal tube 8 in this manner relative to the core, the coil-ferrite combination inductance is improved as compared to the case where the top edge of metal tube 8 is positioned so as to project outward from the top of ferrite core 7 in FIG. 1A. Herein, the term "top edge" is defined as that one of the two end edges of metal tube 8 which is farther from Edison type socket 10 than the other edge.

Figure 2A:
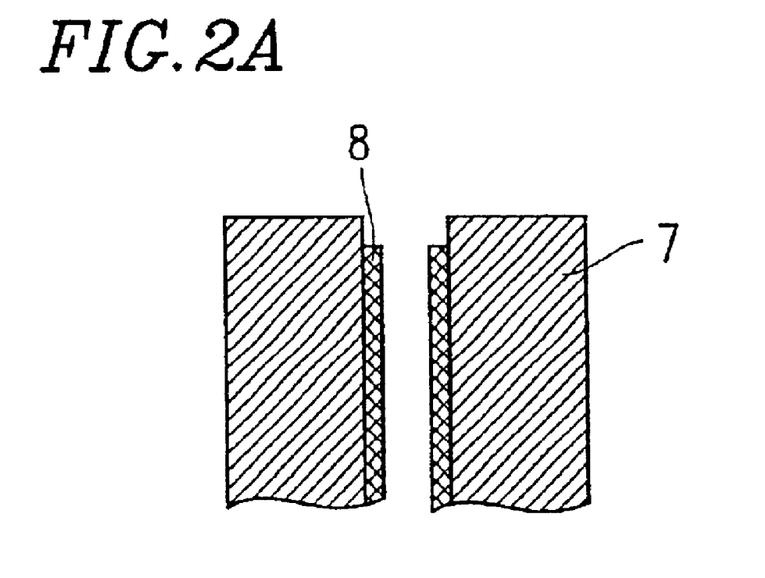
FIGS. 2A and 2B are views illustrating how magnetic and cooling structures are relatively positioned.
Figure 2B:
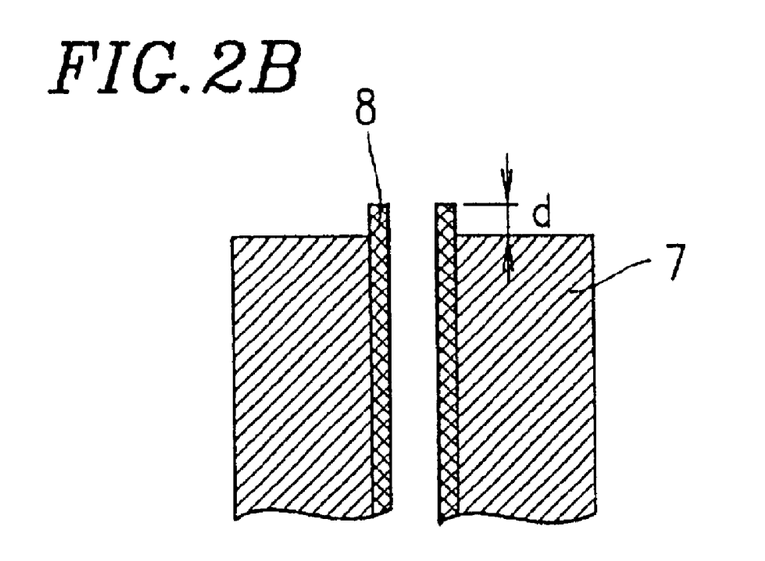

FIG. 2A shows a configuration where the top edge of metal tube 8 is positioned so as not to project outward from the end edge of ferrite core 7 (i.e., where the top edge of metal tube 8 is inside a hollow portion of ferrite core 7.) FIG. 2B shows a configuration where the top edge of metal tube 8 is positioned so as to protect outward from the end edge of ferrite core 7 by a distance "d". In the case where the top edge of metal tube 8 was positioned shown in FIG. 2A, the coil-ferrite combination inductance $L_c$ was 387.4 $\mu$H, the electrical resistance component was 0.602 $\Omega$, and the quality factor, Q was 404.2. In the case where the top edge of metal tube 8 was positioned as shown in FIG. 2B and d=5 mm, the coil-ferrite combination inductance $L_c$ was 384.3 $\mu$H, the electrical resistance component was 0.794 $\Omega$, and the quality factor, Q was 303.8. As can be appreciated, when the top edge of metal tube 8 projects outward from the end edge of ferrite core 7, the coil-ferrite combination inductance decreases and the electrical resistance component increases. Therefore, the coil power loss during operation increases. Furthermore, metal tube 8 is undesirably heated to high temperature by eddy currents generated through the magnetic fields provided by the coil and core during lamp operation occurring in the outward projecting portion of metal tube 8 past the end edge of core 7.

Metal tube 8 is thermally coupled to ferrite core 7. Herein, the expression "metal tube 8 is thermally coupled to ferrite core 7" is defined to simply indicate that metal tube 8 and ferrite core 7 are positioned so that heat can be transmitted between metal tube 8 and ferrite core 7. This expression is not limited to indicate that metal tube 8 and ferrite core 7 are in contact with each other. Throughout this specification, the expression "thermally coupled" is defined to indicate similar states.

Metal tube 8 and cylinder 9 in this embodiment are welded to each other or made from a single piece of material. In other words, one end of metal tube 8 is thermally coupled to cylinder 9.

Cylinder 9 is also thermally coupled to Edison type socket 10. Thus, the heat from ferrite core 7 and the walls of reentrant cavity 2 is transferred via metal tube 8 to the cylinder 9 and then transmitted to Edison type socket 10.

As can be appreciated, metal tube 8 and cylinder 9 of FIG. 1A act as a heat conduction means for conducting the heat generated in ferrite core 7 to Edison type socket 10. Edison type socket 10 is connected to an electrical power line external to the electrodeless fluorescent lamp through a corresponding lamp holder in order to receive the electrical power to be supplied to operate the electrodeless fluorescent lamp, and therefore the heat generated while the electrodeless fluorescent lamp is in use is conducted to the outside of the electrodeless fluorescent lamp through Edison type socket 10.

Cylinder 9 has a helical thread thereabout which can be coupled to the helical thread formed in the wall of the Edison type socket 10 by screw-in engagement. Cylinder 9 and Edison type socket 10 are thus mechanically and thermally coupled to each other through one being screwed into the other using these threads.

The heat conduction means shown in FIG. 2A in which the top edge of metal tube 8 is positioned inside the hollow portion of ferrite core 7 so as to improve the coil-ferrite combination inductance need not have only the structural arrangement shown in FIG. 1A. The heat conduction means can have any other structure as long as it provides the function of conducting the heat generated in ferrite core 7 and the walls of reentrant cavity 2 to the outside of the electrodeless fluorescent lamp. In any others of such structures, the heat transmission arrangement therein can also provide the effect of improving the coil-ferrite combination inductance by positioning the top edge of any metal tube used therewith inside the hollow portion of ferrite core 7 to being within that core, as compared to the case where the top edge of a metal tube projects outward past the end of ferrite core 7.

Instead of metal tube 8, a tube formed of a ceramic material can be used. Tube 8 and cylinder 9 are preferably each formed of a material having a high thermal conductivity and a high electrical resistivity, in order to both effectively conduct the heat generated in ferrite core 7 to Edison type socket 10 and to restrict the generating of eddy currents in tube 8 and cylinder 9 from the magnetic fields provided by the coil and the core during lamp operation. Specifically, tube 8 and cylinder 9 are preferably formed of a material having a thermal conductivity of 20 W/m·K or more and an electrical resistivity of 2 $\Omega$·m or more. Tube 8 and cylinder 9 can be formed of a metal material such as, for example, copper or aluminum or a ceramic material such as, for example, alumina, aluminum nitride or silicon carbide, or some combination of each such material.

A ferrite plate 11 increases the coil-ferrite combination effective permeability, $\mu_{eff}$, and the coil-ferrite combination inductance, $L_c$, to result in an increase in value of the coil-ferrite combination quality factor, Q (Q=550 at f=100 kHz), and in a decrease of the coil-ferrite combination power losses, $P_{loss}$. Consequently, the lamp has high power efficiency, $(\eta=P_{pl}/P_{lamp}=(P_{lamp}-P_{loss})/P_{lamp})$ and high efficacy.

Ferrite plate 11 is formed of a magnetically permeable material to aid in configuring the spatial distribution of magnetic fields generated by oscillatory electric current flows through coil 6 from the driver circuit and the presence of core 7. Ferrite plate 11 is positioned so that at least a portion of the magnetic flux passing through ferrite core 7 passes also through ferrite plate 11. In other words, ferrite plate 11 is magnetically coupled to ferrite core 7.

Ferrite plate 11 is, for example, a disk formed of a material identical with the material of ferrite core 7.

Figure 3A:
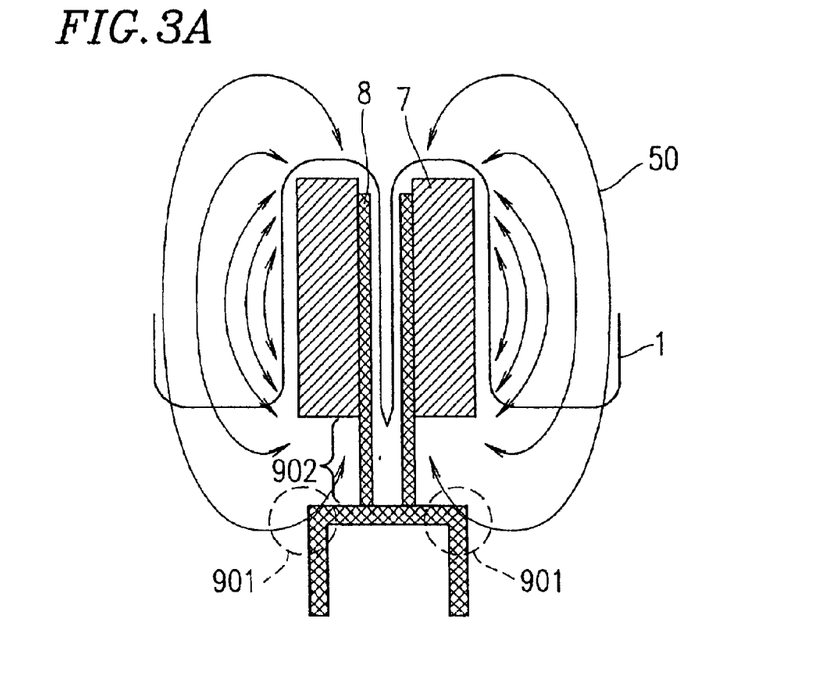
FIGS. 3A, 3B and 3C show representations of instantaneous magnetic fields in the vicinity of a magnetic core, and in the vicinity of a further disk in the last two instances that is formed of a magnetic material.

FIG. 3A schematically shows a representation of the spatial distributions of instantaneous magnetic fields generated in the vicinity of ferrite core 7 by an oscillatory electric current flowing through coil 6 in the absence of ferrite plate 11. As shown in FIG. 3A, in the absence of ferrite plate 11, magnetic fluxes 50 pass through cylinder 9 (portion 901). When cylinder 9 is formed of material in which eddy currents can be significantly generated (for example, a metal material), such eddy currents are generated in cylinder 9 by the passage of magnetic fluxes 50 through cylinder 9. Thus, unwanted coil power loss occurs and the lamp efficacy is reduced. The portion of cylinder 9 in which such eddy currents are generated is thereby heated so that its temperature is raised. The temperature rise of cylinder 9 has an adverse effect on the lamp oscillatory driver and the associated matching network located in a region 13 shown in FIG. 1A due to the heating of same, and moreover reduces the ability of tube 8 and cylinder 9 to function as a good heat conduction means for conducting the heat generated in ferrite core 7 to Edison type socket 10.

Figure 3B:
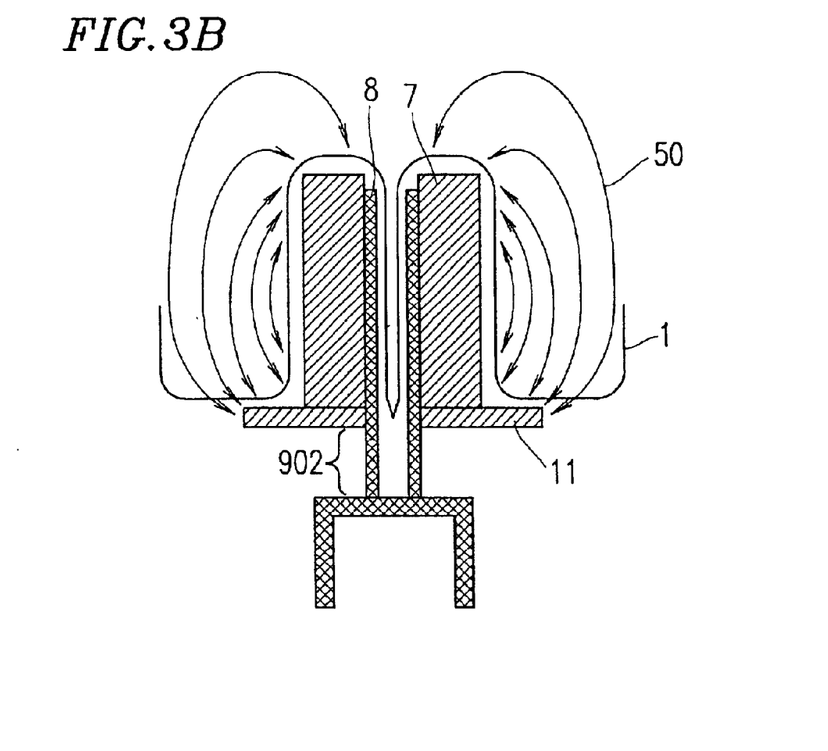

FIG. 3B shows that when ferrite plate 11 is located at the bottom of ferrite core 7, the spatial distributions of the instantaneous magnetic fields generated by the coil and core is reconfigured. In FIG. 3B, as compared with in FIG. 3A, the spatial extent of the significant resulting instantaneous magnetic fields for the same coil currents is smaller and that the quantities of magnetic fluxes occurring outside envelope 1 are smaller as a result of the provision of ferrite plate 11. Therefore, the number of lines of magnetic flux passing through cylinder 9 for the same coil currents is reduced in the FIG. 3B structure from those so passing in the FIG. 3A structure. Since the generation of eddy currents in cylinder 9 is restricted in the FIG. 3B structure, cylinder 9 is prevented from reaching an unduly high temperature due to induced eddy currents. Eddy currents can be generated in a portion 902 of metal tube 8 shown in FIG. 3A. In the case where ferrite plate 11 is located at the bottom of ferrite core 7 as shown in FIG. 3B, portion 902 of the metal tube 8 is kept from having a high temperature due to the generation of eddy currents therein because of the presence of ferrite plate 11.

As can be appreciated, ferrite plate 11 acts as a heat generation reduction means for reducing thermal influences of the magnetic fields generated by electric currents flowing through coil 6 being exerted on metal tube 8 and cylinder 9 (i.e., the heat conduction means). As stated above, the heat conduction means need not have only the structural arrangement shown in FIG. 1A. The heat conduction means can have any other structure as long as it provides the function of conducting the heat generated in ferrite core 7 and the walls of reentrant cavity 2 to the outside of the electrodeless fluorescent lamp. With the other structures of the heat conduction means, ferrite plate 11 can act as a heat generation reduction means for reducing thermal influences otherwise exerted on the heat conduction means.

Since the provision of ferrite plate 11 can prevent the generation of eddy currents in metal tube 8 and cylinder 9 during lamp operation, metal tube 8 and cylinder 9 can, with the presence of this plate, be formed of a material having a lower electrical resistivity. Such a broad selection of materials which can be used for metal tube 8 and cylinder 9 is preferable over a narrower selection in that use of a wider variety of materials having a high thermal conductivity is allowed, resulting in improvement of the function of metal tube 8 and cylinder 9 as the heat conduction means.

Ferrite plate 11 also acts as a magnetic field reconfiguration means for improving the power efficiency and the efficacy of the electrodeless fluorescent lamp by reforming or reshaping the magnetic field spatial distribution generated by the coil and core during lamp operation to that configuration shown in FIG. 3B, regardless of the presence or absence of metal tube 8 and cylinder 9.

Figure 3C:
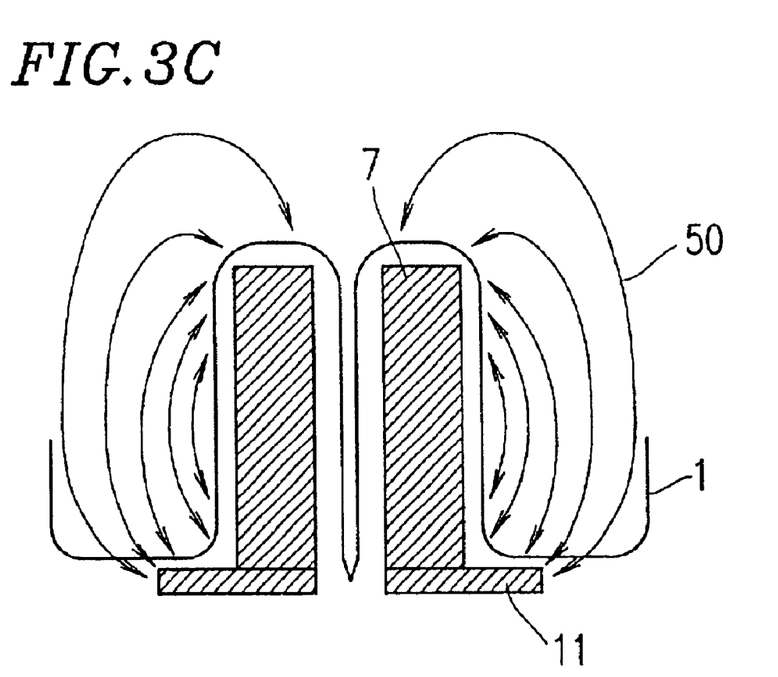

FIG. 3C schematically shows a representation of the spatial distributions of instantaneous magnetic fields generated by the coil and core for oscillatory currents in the coil in the vicinity of ferrite core 7 of an electrodeless fluorescent lamp in which tube 8 and cylinder 9 forming the heat conduction means are excluded but in which ferrite plate 11 is provided. Due to the presence of ferrite plate 11, the spatial distributions of the magnetic field generated during lamp operation are reconfigured to that shown in this figure. Hence, the quantity of magnetic fluxes passing through envelope 1 increases over the structure of FIG. 3A for the same coil currents, and thus the power efficiency and the efficacy of the electrodeless fluorescent lamp are improved.

Thermal shield 12, shown in FIG. 1A, is made from a nonmetallic material having a low thermal conductivity, and so thermally insulates region 13 from ferrite core 7 and ferrite plate or disk 11. Herein, the expression "thermally insulate" is defined to include the meaning of "restricted heat transmission". For the thermal shield 12, material offered under the mark XYDAR, for example, having a thermal conductivity of about 0.36 W/m·K is preferably used. The mark XYDAR is a registered trademark of Amoco Polymers, Inc. Materials used to form thermal shield 12 preferably have thermal conductivities of 0.4 W/m·K or less.

Thermal shield 12 acts as restriction means for restricting the heat generated in ferrite core 7 and the walls of reentrant cavity 2 from being transmitted to the driver circuit positioned therebelow in FIG. 1A.

Region 13 shown in FIG. 1A occurs inside an enclosure 14, and is used to contain the lamp oscillatory driver circuit, including the associated matching network (not shown), and has a resulting temperature during operation that is kept below 100° C. by the arrangements describe above. Enclosure 14, made from nonmetallic material (e.g. plastic), is glued to lamp bottom 4 and to Edison type socket 10 to be positioned therebetween. Protective and phosphor coatings 15 and 16, respectively, are disposed on the inner surfaces of envelope 1 and reentry cavity 2 but are shown only in part in FIG. 1A for clarity. Reflective coating 17 (alumina or the like) is disposed on the inner surface of bottom 4 of envelope 1 and on the inner surface of cavity 2 and is again shown only in part. To minimize visible light losses via bottom 4 and cavity walls 2, the outer surface of the bottom 4 and the walls 2 are coated with the reflective coating 18 (alumina or the like) as shown in FIG. 1A. A few glass rods 19 shown in FIG. 1A are used to position amalgam 5 inside tubulation 3. (When the lamp is operated without amalgam 5, no glass rods are used). To further reduce temperature inside region 13 where the oscillatory driver and matching network are located, a few slits 20 can be provided in enclosure 14.

Figure 4:
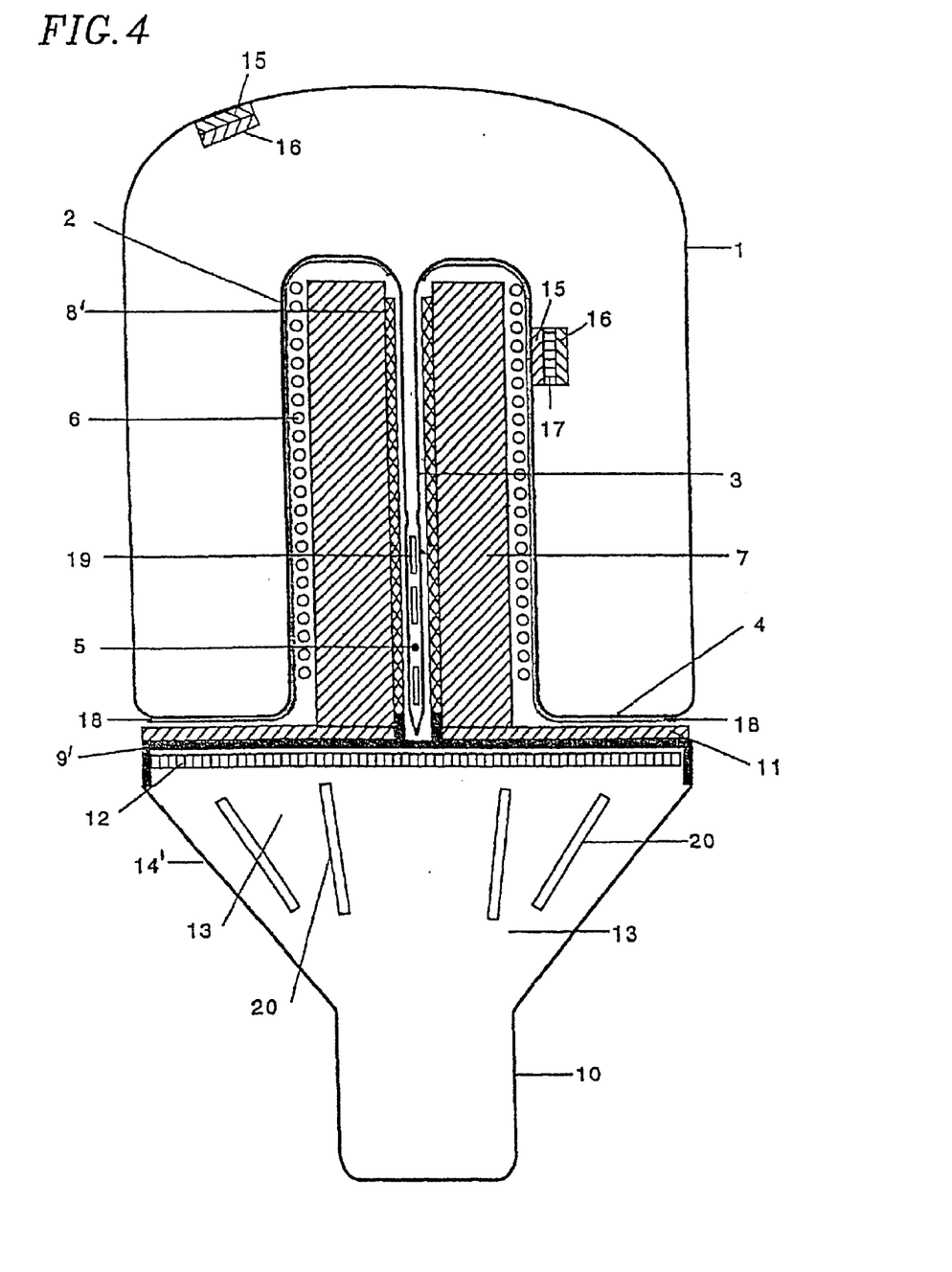
FIG. 4 is a cross-sectional view of a second embodiment of the present invention for an electrodeless compact fluorescent lamp.

A second embodiment of the present invention is shown in FIG. 4. The cooling arrangement comprises a tube 8' made from a material of high thermal conductivity such as alumina, copper, aluminum or the like and a ceramic material "skirted disk" 9' having a high thermal conductivity (aluminum oxide, aluminum carbide, or the like). Skirted disk 9' is connected to, and in thermal contact with tube 8' at the center of its disk, and has the outer peripheral disk portions connected to a truncated cylindrical shell "skirt" as a part thereof that is glued between bottom 4 of envelope 1 and enclosure 14' This whole cooling structure could also be made from a single piece of ceramic material. The use of a metal with a high thermal conductivity, such as copper or aluminum, for the whole of the cooling arrangement is not desirable due to the high losses that would occur in such an arrangement during operation due to eddy current generated therein caused by the magnetic field generated by currents in the coil. In order to prevent large eddy currents from being generated in the cooling arrangement, it is preferable that the cooling arrangement be formed of a material having a high electrical resistivity. The electrical resistivity of the material used for the cooling arrangement is preferably equal to or higher than the electrical resistivity of copper (2 Ω·m). In order to remove the heat from ferrite core 7, the material used for the cooling arrangement preferably has a high thermal conductivity. The thermal conductivity of the material used for the cooling arrangement is preferably equal to or higher than the thermal conductivity of alumina (20 W/m·K).

The cooling arrangement acts as thermal conduction means for transmitting the heat generated in ferrite core 7 and the walls of reentrant cavity 2 to the outside of the electrodeless fluorescent lamp.

The heat from ferrite core 7 and cavity walls 2 is transferred via tube 8' to ceramic material skirt 9', and then is removed from the lamp by transmission via convection to the ambient atmosphere outside the outer skirt portions of skirted disk 9'. Thermal shield 12 is made from a material with a low thermal conductivity that also helps to reduce heat transfer to driver circuit region 13 and keeps the temperature in this region below about 100° C.

In order to further reduce the temperature of the electronic components in region 13, slits 20 may be provided in enclosure 14'. This, however, is optional depending on the lamp operation environment.

In the second embodiment shown in FIG. 4, it is preferable to again position the top edge of tube 8' inside the hollow portion of ferrite core 7 as in the first embodiment of FIG. 1A.

In the first and second embodiments, the shape of envelope 1 is not limited to the shape shown in FIG. 1A or in FIG. 4. For example, envelope 1 can have a shape without the reentry cavity 2. Envelope 1 can be formed of a ceramic material instead of glass. It is sufficient for envelope 1 to be at least partially light-transmissive.

Figure 5:
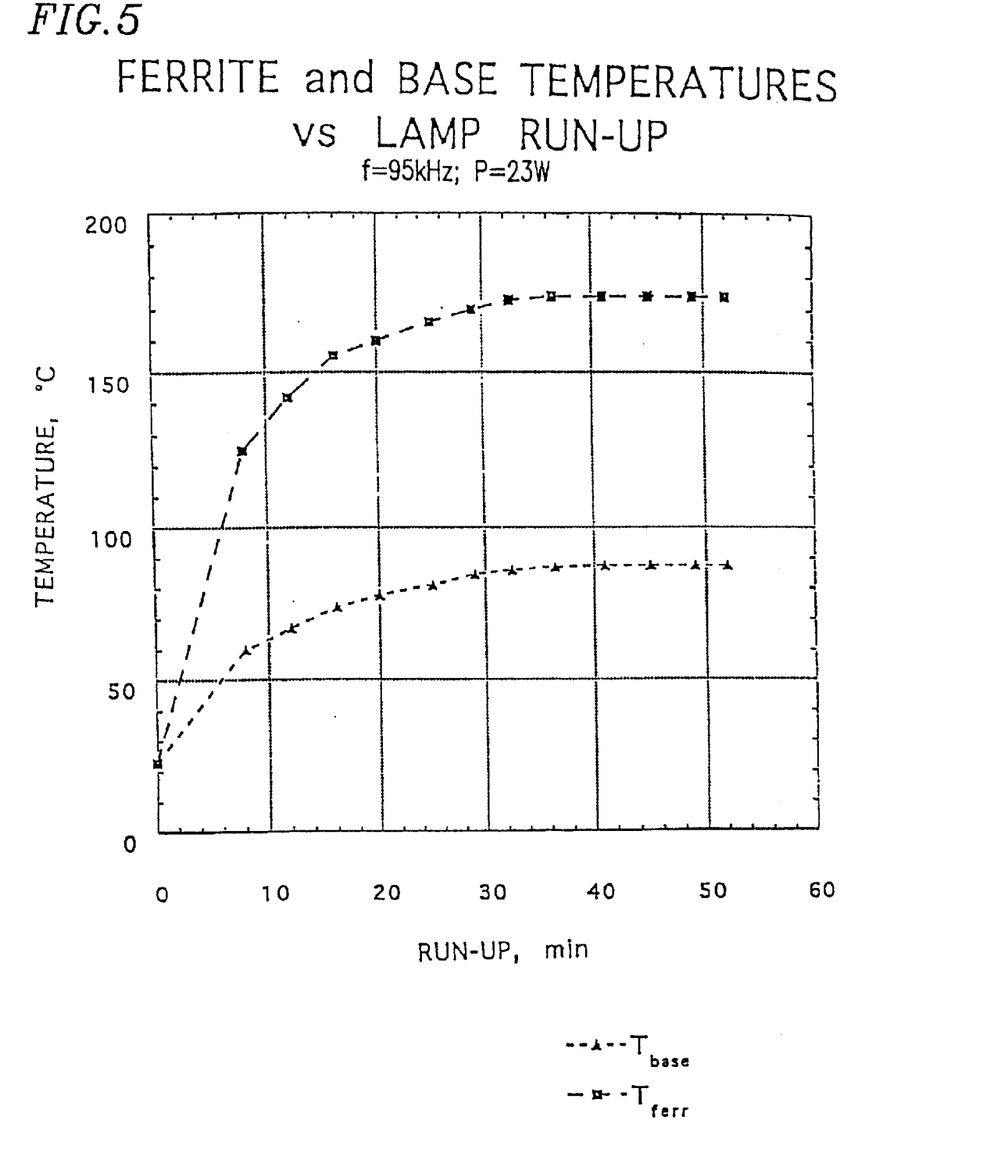
FIG. 5 is a graph showing the run-up temperatures of a portion of the interior of such a lamp.

The temperature of ferrite core 7, $T_{ferr}$, and inside region 13, near thermal shield 12, $T_{base}$, are given in FIG. 5 for the embodiment of FIG. 1A as functions of the lamp run-up time for the oscillatory driving circuit frequency of 95 kHz and RF power of 23 W. It is seen that after about 35 minutes of operation, both temperatures stop increasing. The stabilized temperature of ferrite core 7 is around 175° C., a temperature that is substantially lower than its Curie point of 220° C. Even if the ambient temperature is 40° C., the ferrite temperature is still below 220° C. The stabilized temperature inside region 13 is about 85° C. so that, at an ambient temperature of 40° C., $T_{base}$ is still lower than 100° C.

The lamp is operated as follows. The envelope is filled with argon at pressures from 0.1 to 3.0 Torr (13.3 Pa to 399 Pa) dependent on the envelope diameter and length. The mercury vapor pressure in the envelope is controlled by the temperature of the amalgam (or mercury cold spot) 5. The 60 Hz line voltage (either the 100 V or 220 V standard commercial voltages) is applied through Edison type socket 10 to the oscillatory driver circuit located in region 13. The high frequency voltage is generated by the driver circuit and applied to coil 6 via the associated impedance matching network. The capacitive discharge with low plasma density is ignited at a coil voltage of around 150–200 V.

When the coil voltage reaches the magnitude that is high enough to maintain in the envelope a self-sustained inductively coupled discharge, a bright discharge appears in the envelope that is accompanied with the decrease of both coil current and voltage. This is the starting of the lamp. The magnitudes of the coil starting voltage and current are determined by the number of turns in the coil, the gas/mercury vapor pressure in the envelope and the envelope geometry.

In the preferred embodiments, the inert gas (argon) pressure in envelope 1 was about 1 torr (about 133 Pa). The envelope diameter is 60 mm and the envelope length is 62 mm. Induction coil 6 has 60 turns wound in two layers. The lamp starting voltage was 1000 V rms. The coil voltage and current, $V_m$ and $I_m$, needed to maintain the inductively coupled discharge decrease as RF power grows. For a coil with 60 turns, the typical coil maintaining voltage $V_m$ varied from 480 V at 15 W to 350 V at 40 W, and the coil current $I_m$ varied from 2.3 A (15 w) to 1.6 A (40 W).

The lamp power efficiency during the lamp operation depends on the coil and ferrite core power losses, $P_{loss}$. The power losses measured in the lamp shown in FIG. 1A (the first embodiment) are plotted as functions of the lamp power, $P_{lamp}$, in FIG. 6 for three oscillatory driving circuit operating frequencies: 101 kHz, 135 kHz and 170 kHz. The power losses were determined as the difference between the lamp forward power, $P_f$, and reflected power, $P_{ref}$, measured for the coil current $I_m$ but in the absence of the RF discharge in the lamp.

Figure 6:
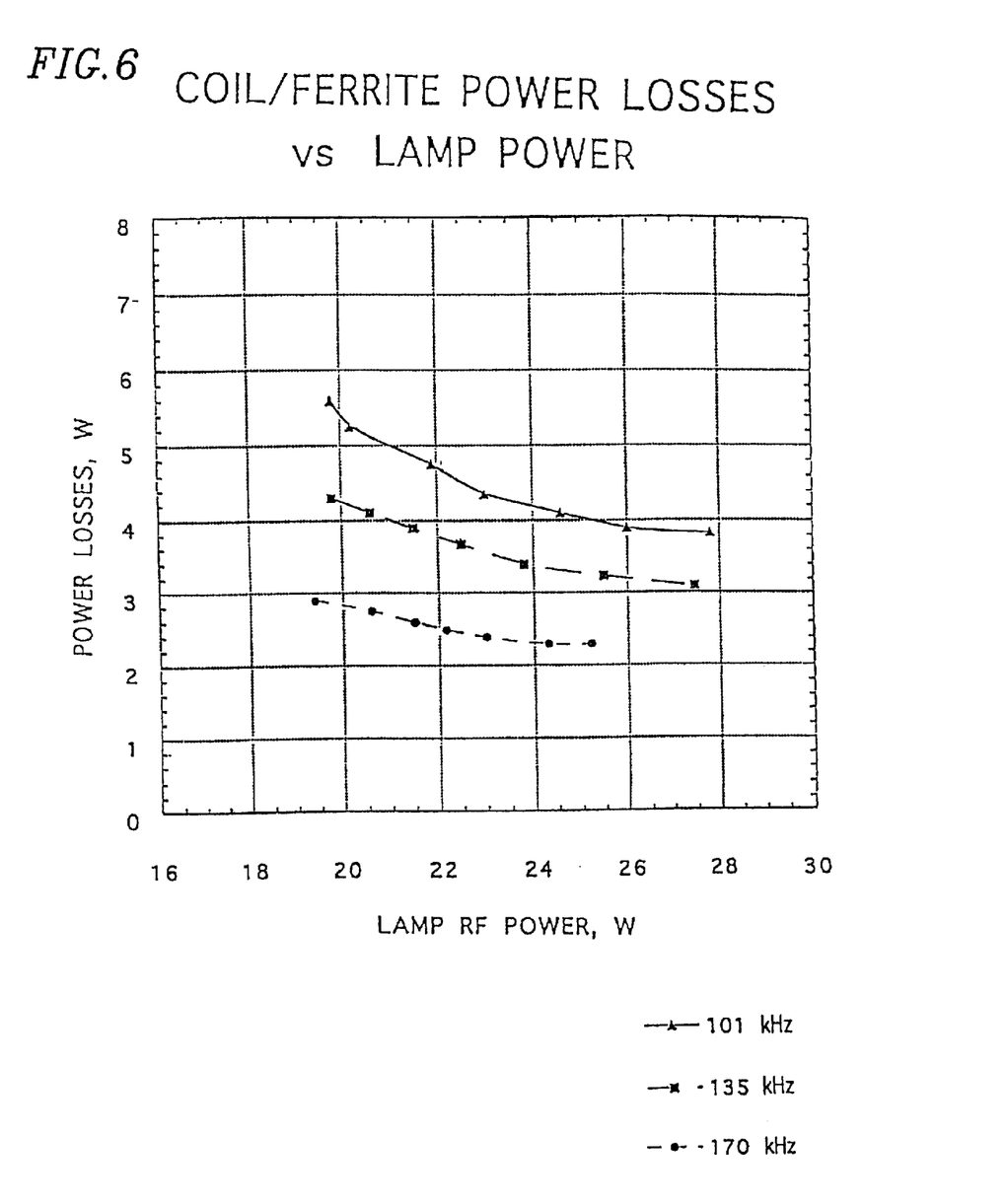
FIG. 6 is a graph showing coil/ferrite power losses as a function of the total lamp power in such a lamp for three lamp operating frequencies.
Figure 7:
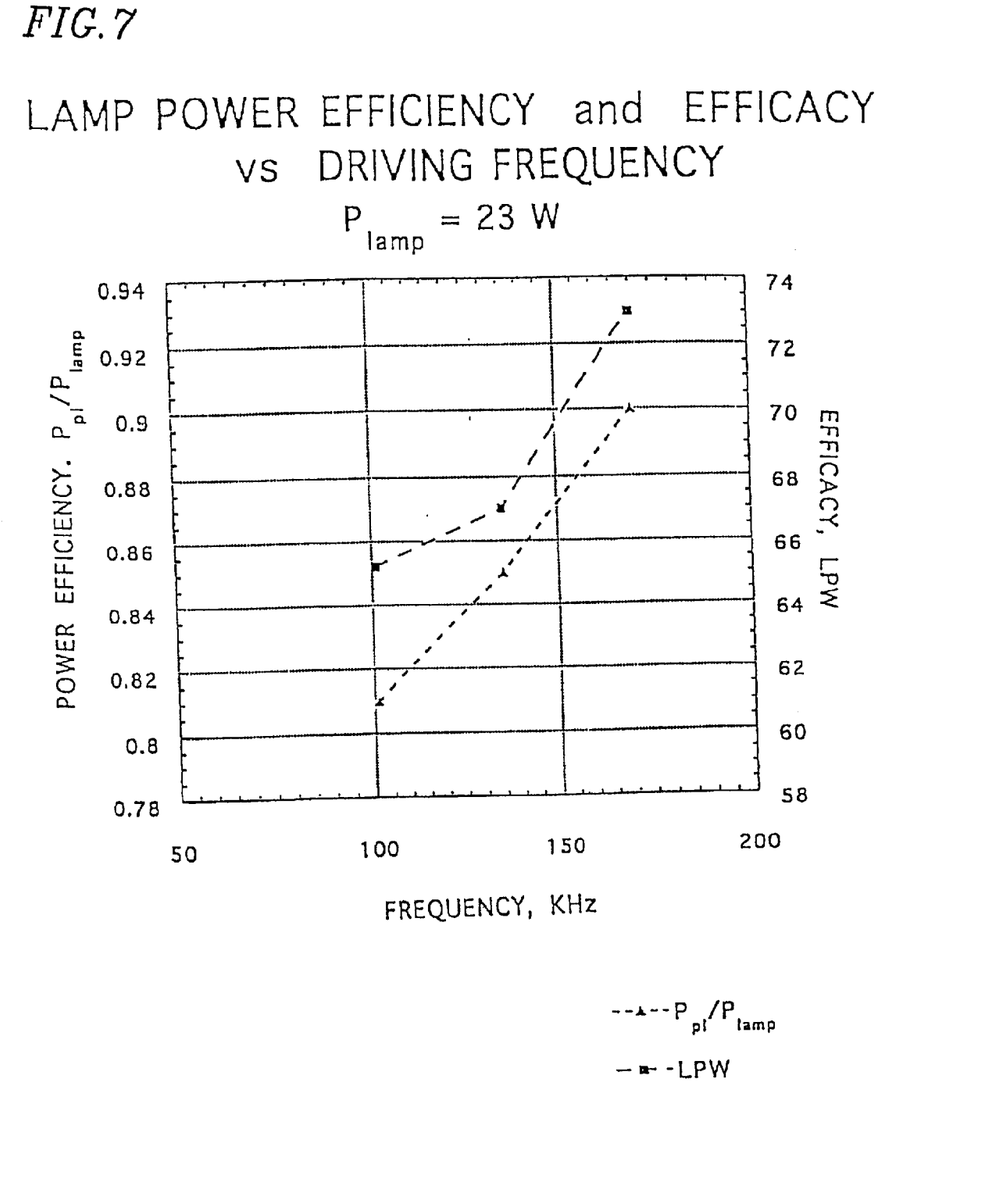
FIG. 7 is a graph showing the lamp power efficiency and efficacy for such a lamp as functions of lamp operating frequency.

It is seen from FIG. 6 that as the lamp RF power increases, the coil-ferrite combination power losses, $P_{loss}$, decreases. For instance, for an operating frequency of 101 kHz, the power losses decrease from 5.6 W at $P_{lamp}$=19.5 W to 3.8 W at $P_{lamp}$=26 W. The increase of the driving circuit operating frequency leads to lower coil-ferrite combination power losses. For instance, at the operating frequency of 170 kHz and the lamp's RF power of 23 W, the coil-ferrite combination power losses are 2.4 W. The decrease of $P_{loss}$ at higher frequencies results in higher lamp power efficiency, $\eta = P_{pl}/P_{lamp}$. The lamp power efficiency, $\eta$ and the lamp efficacy (LPW) are shown in FIG. 7 as functions of the driver circuit operating frequency, f, for the lamp described in FIG. 1A (the first embodiment) and operated at lamp RF power of 23 W. It is seen that $\eta$ increases as the driver circuit operating frequency increases from 0.81 at f=101 kHz to 0.9 at f=170 kHz. It is expected that the lamp efficacy also increases with the operating frequency. Indeed, as it is shown in FIG. 7, the lamp efficacy increases from 65 LPW at f=101 kHz to 73 LPW at f=170 kHz.

It should be mentioned here that the efficacy of the lamp described in the present invention and operated at a driver circuit frequency as low as 100 kHz is higher than that of the Genura electrodeless fluorescent lamp referred to above operated at the same RF power but at substantially higher driver circuit frequency of 2.65 MHZ.

The present invention is not limited to be applicable to only an electrodeless fluorescent lamp. For example, the present invention is applicable to an electrodeless lamp in which the inner wall of the envelope 1 (FIG. 1A and FIG. 4) is not coated with the phosphor coating 16 and thus light by discharge is directly released to the outside of the envelope 1, based on a similar principle to the above-described operational principle.

Although the present invention has been described with reference to preferred embodiments, workers skilled in the art will recognize that changes may be made in form and detail without departing from the spirit and scope of the invention.

What is claimed is:

1. An electrodeless lamp, comprising:
   an envelope containing a discharge gas;
   a magnetic material core in the envelope;
   an induction coil wound around the magnetic material core;
   a socket affixed to the envelope for receiving electrical power supplied to the electrodeless lamp;
   a driver circuit in the envelope electrically connected to the socket for supplying an oscillatory electric current to the induction coil to operate the electrodeless lamp; and
   a heat conduction means thermally coupled to the magnetic material core and the socket for conducting heat generated in the magnetic material core to the socket.

2. An electrodeless lamp according to claim 1 wherein the envelope has a reentry cavity, and the magnetic material core is positioned to be adjacent to the reentrant cavity.

3. An electrodeless lamp according to claim 1 wherein:
   the magnetic material core has a hollow portion;
   the heat conduction means includes a tube and a cylindrical portion thermally coupled to the tube; and
   at least a portion of the tube is positioned inside the hollow portion, and the cylindrical portion is thermally coupled to the socket.

4. An electrodeless lamp according to claim 1 wherein the heat conduction means is formed of a material having a thermal conductivity of 20 W/m·K or higher and an electrical resistivity of 2 Ω·m or higher.

5. An electrodeless lamp according to claim 1 wherein the heat conduction means is formed of at least one of a metal material and a ceramic material.

6. An electrodeless lamp according to claim 5 wherein the metal material includes at least one of copper and aluminum.

7. An electrodeless lamp according to claim 5 wherein the ceramic material includes at least one of alumina, aluminum nitride, and silicon carbide.

8. An electrodeless lamp according to claim 3 wherein the socket has a first thread, and the cylindrical portion has a second thread which can be coupled to the first thread.

9. An electrodeless lamp according to claim 3 wherein one end of the tube is thermally coupled to the cylindrical portion, and the other end of the tube is positioned inside the hollow portion of the magnetic core.

10. An electrodeless lamp, comprising:
    an envelope containing a discharge gas;
    a magnetic material core in the envelope;
    an induction coil wound around the magnetic material core;
    a driver circuit in the envelope for supplying an oscillatory electric current to the induction coil to operate the electrodeless lamp; and
    a configuration means magnetically coupled to the magnetic material core for shaping a magnetic field generated by the electric current flowing through the induction coil so as to aid in directing a resulting magnetic flux to pass through the envelope.

11. An electrodeless lamp according to claim 10 wherein the configuration means includes a disk formed of a magnetic material which is magnetically coupled to the magnetic material core.

12. An electrodeless lamp according to claim 11 wherein the kind of magnetic material in the disk is identical to the kind of material in the magnetic material core.

13. An electrodeless lamp, comprising:
    an envelope containing a discharge gas;
    a magnetic material core in the envelope;
    an induction coil wound around the magnetic core;
    a driver circuit in the envelope for supplying an oscillatory electric current to the induction coil to operate the electrodeless lamp;
    a heat conduction means thermally coupled to the magnetic material core for conducting heat generated in the magnetic material core to the outside of the electrodeless lamp; and
    a heat reduction means magnetically coupled to the magnetic material core for reducing thermal influences of magnetic fields generated by the electric current flowing through the induction coil that are exerted on the heat conduction means.

14. An electrodeless lamp according to claim 13 wherein the heat reduction means includes a disk formed of a magnetic material which is magnetically coupled to the magnetic material core.

15. An electrodeless lamp according to claim 14 wherein the kind of magnetic material in the disk is identical to the kind of material in the magnetic material core.

16. An electrodeless compact fluorescent lamp for use in a suitable fixture, the lamp comprising:
    a bulbous transparent envelope;
    a discharge gas provided in the envelope;
    an enclosure secured between the envelope and a lamp holder engagement structure to provide at least in part an interior space therebetween;
    an induction coil positioned adjacent the envelope, the induction coil for forming a plasma in the envelope to produce electromagnetic radiation;
    a magnetic field manipulation structure of a magnetically permeable material positioned adjacent the induction coil so as to separate the induction coil from most of the interior space; and a primary cooling structure of a thermally conductive material positioned adjacent the magnetic field manipulation structure and in part to extend into the interior space.

17. The device of claim 16 wherein the primary cooling structure has a portion thereof secured between the envelope and the enclosure.

18. The device of claim 16 wherein the primary cooling structure has a portion thereof extending to the lamp holder engagement structure.

19. The device of claim 16 wherein the primary cooling structure has that portion thereof immediately adjacent the magnetic field manipulation structure formed as a tube portion with an end of that tube portion farthest from the enclosure surrounded by a portion of the magnetic field manipulation structure which extends past the end of the tube further from the enclosure.

20. The device of claim 17 wherein there is a thermal insulator positioned between the magnetic field manipulation structure and portions of the interior space.

21. The device of claim 18 wherein there is a thermal insulator positioned between the magnetic field manipulation structure and portions of the interior space.

* * * * *

UNITED STATES PATENT AND TRADEMARK OFFICE
CERTIFICATE OF CORRECTION

PATENT NO. : 6,768,248 B2
DATED : July 27, 2004
INVENTOR(S) : Robert Chandler et al.

It is certified that error appears in the above-identified patent and that said Letters Patent is hereby corrected as shown below:

Title page,
Item [57], ABSTRACT,
Line 2, after "core", delete "t"

Column 9,
Line 33, delete "in the envelope"
Line 41, delete "reentry", insert -- reentrant --
Line 64, delete "can be", insert -- is mechanically --

Column 10,
Lines 10 and 29, delete "in the envelope"
Lines 13 and 19, delete "configuration", insert -- reconfiguration --
Lines 48-49, delete "for use in a suitable fixture"

Column 11,
Lines 5, 8 and 11, delete "device", insert -- lamp --

Column 12,
Lines 5 and 8, delete "device", insert -- lamp --

Signed and Sealed this

Fifth Day of April, 2005

JON W. DUDAS
*Director of the United States Patent and Trademark Office*